(12) United States Patent
Speyer

(10) Patent No.: US 7,854,190 B2
(45) Date of Patent: Dec. 21, 2010

(54) BORON CARBIDE COMPONENT AND METHODS FOR THE MANUFACTURE THEREOF

(75) Inventor: Robert F. Speyer, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 862 days.

(21) Appl. No.: 11/402,040

(22) Filed: Apr. 11, 2006

(65) Prior Publication Data

US 2010/0288113 A1 Nov. 18, 2010

Related U.S. Application Data

(60) Provisional application No. 60/670,050, filed on Apr. 11, 2005.

(51) Int. Cl.
*F41H 5/04* (2006.01)
(52) U.S. Cl. ........................... 89/36.02; 423/291
(58) Field of Classification Search ............... 89/36.02; 423/291
See application file for complete search history.

(56) References Cited

U.S. PATENT DOCUMENTS

| | | | |
|---|---|---|---|
| 1,703,417 A * | 2/1929 | Donaldson | 164/76.1 |
| 2,027,786 A | 1/1936 | Ridgway et al. | |
| 3,348,967 A | 10/1967 | Hucke | |
| 3,715,265 A * | 2/1973 | Allen et al. | 428/143 |
| 3,914,371 A | 10/1975 | Benton et al. | |
| 3,977,294 A * | 8/1976 | Jahn | 89/36.02 |
| 4,004,934 A | 1/1977 | Prochazka | |
| 4,005,235 A | 1/1977 | Prochazka | |
| 4,104,062 A | 8/1978 | Weaver | |
| 4,195,066 A | 3/1980 | Schwetz et al. | |
| 4,495,123 A | 1/1985 | Hunold et al. | |
| 4,524,138 A | 6/1985 | Schwetz et al. | |
| 4,704,250 A | 11/1987 | Cline et al. | |
| 4,762,810 A | 8/1988 | Endo et al. | |
| 4,784,335 A | 11/1988 | Huether | |
| 4,804,525 A | 2/1989 | Rafaniello et al. | |
| 4,879,165 A | 11/1989 | Smith | |
| 4,946,808 A | 8/1990 | Wei et al. | |
| 4,980,104 A | 12/1990 | Kawasaki | |
| 5,010,043 A | 4/1991 | Ringwood | |
| 5,089,197 A | 2/1992 | Butler et al. | |

(Continued)

FOREIGN PATENT DOCUMENTS

JP 59-162180 9/1984

(Continued)

OTHER PUBLICATIONS

Nihara, et al.; The Effect of Stoichiometry on Mechanical Properties of Boron Carbide; Communications of the American Ceramic Society; Jan. 1984; pp. C-13-C-14.

(Continued)

*Primary Examiner*—Stephen M Johnson
(74) *Attorney, Agent, or Firm*—Ostrolenk Faber LLP

(57) ABSTRACT

A boron carbide body having a graphite content in which the central portion of the body includes more graphite that the region surrounding the central portion and adjacent the exterior surface thereof, and a method for fabricating the boron carbide body.

11 Claims, 4 Drawing Sheets

U.S. PATENT DOCUMENTS

| | | | |
|---|---|---|---|
| 5,182,059 | A | 1/1993 | Kawasaki et al. |
| 5,312,788 | A | 5/1994 | Li et al. |
| 5,348,694 | A | 9/1994 | Goldberger |
| 5,349,893 | A * | 9/1994 | Dunn .................. 89/36.05 |
| 5,505,899 | A | 4/1996 | Sigl et al. |
| 5,523,268 | A | 6/1996 | Ukyo et al. |
| 5,543,370 | A | 8/1996 | Sigl et al. |
| 5,545,687 | A | 8/1996 | Burns et al. |
| 6,609,452 | B1 | 8/2003 | McCormick et al. |
| 6,613,462 | B2 | 9/2003 | Macki et al. |
| 6,699,450 | B2 | 3/2004 | Dunn et al. |
| 6,807,891 | B2 | 10/2004 | Fisher |
| 6,855,428 | B2 | 2/2005 | Lau et al. |
| 2004/0065868 | A1 | 4/2004 | Aghajanian et al. |
| 2004/0083880 | A1 | 5/2004 | Cohen |
| 2004/0208772 | A1 | 10/2004 | Eiberger et al. |

FOREIGN PATENT DOCUMENTS

| | | |
|---|---|---|
| JP | 62-153166 | 7/1987 |
| JP | 2000-154062 | 6/2000 |
| WO | WO 00/68165 | 11/2000 |

OTHER PUBLICATIONS

Lee et al.; Hardness and Fracture Toughness of Pressureless-Sintered Boron Carbide ($B_4C$); J. AM. Ceram. Soc. 85 [5]; 2002; pp. 1291-1293.

Cho, et al., "Density- and hardness-optimized pressureless sintered and post-hot isostatic pressed $B_4C$," J. Mater. Res., vol. 20, No. 8 (Aug. 2005), pp. 2110-2116.

Edited by Onoda, Jr. and Hench; Ceramic Processing Before Firing; The Rheology of Organic Binder Solutions; pp. 249-251.

Characteristics and Properties of Silicon Carbide and Boron Carbide; Handbook of Refractory Carbides and Nitrides; pp. 137-155.

Champagne et al.; Mechanical Properties of Hot-Pressed $B-B_4C$ Materials; 1977; 4 pages.

M.A. Kuzenkova, P.S. Kislyi, B.L. Grabchuk and N.I. Bodnaruk, "The Structure and Properties of Sintered Boron Carbide" J. of Less-Common Metals 67 217-223 (1979).

Bouchacourt; et al.; The Properties and Structure of the Boron Carbide Phase; Journal of the Less-Common Metals; 1981; vol. 82; pp. 227-235.

J. Beauvy, "System B-C, Solid State Phase Equilibria" J. Less Common Metals, 90 [2] 169-75 (1983).

D. Emin, "Structure and Single-Phase Regime of Boron Carbide," Phys. Rev. B, 31 6041-6054 (1988).

Z. Zakhariev and D. Radev, "Properties of Polycrystalline Boron Carbide Sintered in the Presence of $W_2B_5$ without Pressing" J. Mater. Sci. Lett. 7 [7] 695-96 (1988).

S.L. Dole, S. Prochazka, and R.H. Doremus, "Microstructural Coarsening During Sintering of Boron Carbide" J. Am. Ceram. Soc. 72 [6] 958-66 (1989).

Francois Thévenot; Boron Carbide—A Comprehensive Review; Journal of the European Ceramic Society; 1990; 6; pp. 205-225.

D.J. Viechnicki, M.L. Savin and M.I. Illiman, Ceram. Bull., 70 1035 (1991).

Williams; Aqueous Dispersion and Slip Casting of Boron Carbide Powder: Effect of pH and Oxygen Content; J. Am. Ceram. Soc.; 1991; 74 [7]; pp. 1614-1618.

C.H. Lee, C.H. Kim, "Pressureless Sintering and Related Reaction Phenomena of $Al_2O_3$-doped $B_4C$" J. Mater. Sci. 27 [23] 6335-340 (1992).

V. Skorokhod Jr., M.D. Vlajic, and V.D. Krstic, "Mechanical Properties of Pressureless Sintered Boron Carbide Containing $TiB_2$ Phase" J. Mater. Sci. Lett., 15 [15] 1337-39 (1996).

M.W. Chase, Jr. NIST-JANAF Thermochemical Tables, 4th Ed., American Institute of Physics, Woodbury, NY 1998.

de Melo et al.; Composition Effects on the Microstructure and Mechanical Properties of Sintered Boron Carbide; Materials Science Forum; vols. 299-300; 1999; pp. 13-18.

Kalandadze et al.; Sintering of Boron and Boron Carbide; Journal of Solid State Chemistry; 2000; 154; pp. 194-198.

Larsson et al.; Improvements of the microstructure and erosion resistance of boron carbide with additives; Journal of Materials Science; 2000; vol. 35; pp. 3433-3440.

Lee et al.; Sintering of Boron Carbide Heat-Treated With Hydrogen; J. Am. Ceram. Soc.; 2002; 85 [8]; pp. 2131-2133.

Lee et al.; Pressureless Sintering of Boron Carbide; J. Am. Ceram. Soc.; 2003; 86 [9]; pp. 1468-1473.

Frage et al.; The effect of the sintering atmosphere on the densification of B4C ceramics; Journal of Solid State Chemistry; 2003; pp. 1-5.

Solid-State Sintering of Mixed Powders, Categorization of Physical and Chemical Interactions; pp. 178-221.

M.L. Wilkins, "Fourth Progress Report of Light Armor Program" Lawrence Livermore National Laboratory (1969).

Y. Kanno et al., "Additive Effect on Sintering of Boron Carbide", The Ceramic Society of Japan, 95[11] 1137-1140 (1987).

R.C. Garvie, "Zirconium and Some of its Binary Systems", High Temperature Oxides, Part II, Academic Press, New York 117-166 (1970).

R.M. German, Sintering Theory and Practice, John Wiley and Sons, New York, pp. 26-27, 74, 209-213 (1996).

* cited by examiner

BORON CARBIDE COMPONENT AND METHODS FOR THE MANUFACTURE THEREOF

RELATED APPLICATION

This application is based on and claims benefit of U.S. Provisional Application Ser. No. 60/670,050, filed on Apr. 11, 2005, entitled PRESSURELESS SINTERING OF BORON CARBIDE, to which a claim of priority is hereby made and the disclosure of which is incorporated by reference.

BACKGROUND OF THE INVENTION

Boron carbide (also referred to here as $B_4C$) is the third hardest material next to diamond and cubic boron nitride. Combined with its low theoretical density (2.52 g/cm$^3$), $B_4C$ is the premier material for personal armor-typically in the form of front and back flat plates which are bonded to a polymer backing and used as ballistic inserts in flack jackets. $B_4C$ is also used for nuclear shielding applications because of boron's high neutron absorption cross-section. In addition, $B_4C$ is used in particulate form as an abrasive, and as a nozzle material for slurry pumping and grit blasting because of its excellent abrasion resistance.

Effective ballistic armor materials must have very high hardness combined with high fracture toughness. When a high-velocity projectile makes contact with the surface of a ballistic material such as $B_4C$, a compressive shock wave extends hemispherically from the point of contact, generating tensile, tangential stresses which cause radial cracks that emanate from the point of contact. These tangential stresses tear open cracks, preferentially at the site of pores and fissures. Therefore, ballistic performance of $B_4C$ improves with decreasing porosity, i.e. with increasing fired relative density.

Achieving near-theoretical density has required gang-hot pressing (stacked parts under pressure). Hot pressing does not allow for the cost effective fabrication of complex shapes. For example, the fabrication of form-fitting body armor parts would require machining after the hot pressing process, which is expensive and technically difficult.

Complex shapes (including form-fitting parts) are possible with pressureless sintering. According to the prior art, agents such as carbon, SiC, $Al_2O_3$, $TiB_2$, $AlF_3$ and $W_2B_5$ have been used as sintering agents in pressureless sintering to increase the sintered density. However, second phases due to the agents often have deleterious effects on the mechanical behavior of $B_4C$.

The best known sintering agent for $B_4C$ is carbon. According to one prior art method, phenolic resin is used as a source of carbon. The carbon from the phenolic resin is distributed around the $B_4C$ particles, and also serves as a pressing agent.

Relative densities up to 98% have been obtained using carbon as a sintering agent. Carbon, when used as a sintering agent in pressureless sintering, however, promotes undesirable secondary phases and materials such as graphite which adversely affect the mechanical properties of the $B_4C$.

Pressureless sintering of $B_4C$ without sintering agents has been difficult. Schwetz et al. in U.S. Pat. No. 4,195,066 cites to studies in which $B_4C$ has been pressureless sintered at near melting temperatures. However, the resulting material suffered in one study from low relative densities, and in the other study from poor mechanical properties compared to materials produced by hot pressing. In addition, Schwetz et al. noted that because the process required reaching close to the melting temperature of $B_4C$ it impaired the dimensional stability of the specimens.

In U.S. patent application Ser. No. 10/867,442, assigned to the assignee of the present invention, the subject matter of which is incorporated by reference, a method is disclosed whereby boron carbide can be sintered through pressureless sintering without intentional addition of sintering agents. While pressureless sintering according to Ser. No. 10/867,442 can result in high relative densities, graphite may still be present in the sintered boron carbide body. The graphite so present is native meaning that its presence is not due to the addition of any intentionally added (non-native) sintering agents added to the $B_4C$ powder to promote sintering. Rather, the native graphite may appear because of the volatilization of $B_4C$, or it may appear due to the presence of excess carbon (carbon in excess of the required stoichiometric $B_4C$) in the $B_4C$ powder.

It is commonly-known by those knowledgeable in the field that the hardness of $B_4C$ decreases precipitously with increasing content of free carbon (graphite) second phase. Because harness is an important property of $B_4C$ it is desirable to remove as much of the graphite as possible.

Furthermore, in a method according to prior art high isostatic pressing was applied in order to increase the relative density of the pressureless sintered $B_4C$ bodies. It is desirable to increase the relative density of the pressureless sintered boron carbide bodies to improve the mechanical properties thereof.

SUMMARY OF THE INVENTION

It is an object of the present invention to provide a sintered boron carbide body having a low graphite content.

It is another object of the present invention to decrease the concentration of graphite of the near surface regions of a $B_4C$ body in order to improve the exterior hardness thereof.

Another object of the present invention is to increase the relative density of a pressureless sintered $B_4C$ body without the addition of sintering agents.

According to one aspect of the present invention a $B_4C$ component is made from a boron carbide body, which includes a native graphite phase, having an exterior surface and a center region, in which the concentration of graphite in a region adjacent the external surface is less than the concentration of graphite at the center region.

In one embodiment of the present invention, the region adjacent the exterior surface is essentially free of graphite, meaning that presence of graphite in the region cannot be detected through X-ray diffraction.

Furthermore, in the preferred embodiment of the present invention, the boron carbide body does not include any phases resulting from a non-native sintering agent in that a process for forming a boron carbide body according to the preferred embodiment does not necessitate the use of a sintering agent. Therefore, the preferred embodiment, other than impurities, residues, or phases resulting from elements native to the starting material (e.g. graphite), only includes stoichiometric $B_4C$.

A $B_4C$ body according to the present invention is a part of an armor arrangement. For example, a $B_4C$ body according to the present invention may part of a personal armor such as a helmet or an armor part that follows the contours of a part of a human body (male or female) such as a human head, torso, back, groin, arm, leg, shoulder, or hip.

A method for preparing a boron carbide body according to the present invention includes forming a boron carbide green body, creating a boron-rich vapor environment around the boron carbide body to suppress preferential volitalization of boron from boron carbide, and sintering the boron carbide body. To create a boron-rich vapor either the boron vapor from the boron carbide body can be restricted or prevented from escaping by placing a boron nitride body in the proximity of or in contact with the boron carbide body, or by packing the boron carbide body in coarse-grained boron carbide which creates a boron-rich vapor from which the specimen benefits and yields a favorable result.

In the preferred embodiment, the boron carbide green body is free from a non-native sintering agent.

Furthermore, preferably, pressureless sintering techniques are employed to sinter a green body according to the present invention. In one preferred embodiment, the pressureless sintering includes heating the boron carbide green body at a first heating rate to a first soak temperature for a first period of time followed by heating the boron carbide body to a second soak temperature at a second heating rate for a second period of time, and then cooling said boron carbide body at a cooling rate. During the first period, the boron carbide body may be heated in vacuum or in the presence of a He/$H_2$ gas mixture. If the boron carbide body is soaked in the presence of the gas mixture, it is preferred to have the boron carbide body soak for an additional period of time in the presence of He or in vacuum in order to purge $H_2$ from interstitial location, within the body of the boron carbide. In order to create the boron-rich vapor, in one embodiment the He flow rate may be reduced to prevent the boron vapor from escaping. The first heating rate may be in the range 50°-150° per minute, and the first soak temperature may be in the range 1100°-1400° C., while the second heating rate may be in the range 50°-150° per minute, and the second soak temperature may be in the range 2100°-2400° C.

A method for preparing a boron carbide body according to another aspect of the present invention includes providing a boron carbide powder mass that includes boron carbide particles of a plurality of different dimensions, separating boron carbide particles of a selected diameter or smaller from the boron carbide power mass, forming a boron carbide green body from the separated boron carbide particles, and pressureless sintering the boron carbide green body to obtain a sintered boron carbide body.

In the preferred embodiment, the separating step is carried out by centrifuging an aqueous suspension of the boron carbide mass. In addition, preferably the boron carbide green body is pressureless sintered by heating the boron carbide green body at a first heating rate to a first soak temperature in the presence of He/$H_2$ gas mixture or in vacuum for a first period of time followed by heating the boron carbide body to a second soak temperature at a second heating rate for a second period of time. If the boron carbide body is soaked in the presence of the gas mixture, it is preferred to have the boron carbide body soak for an additional period of time in the presence of He in order to purge $H_2$ from interstitial locations within the body of the boron carbide. The first heating rate may be in the range 50°-150° per minute, and the first soak temperature may be in the range 1100°-1400° C., while the second heating rate may be in the range 50°-150° per minute, and the second soak temperature may be in the range 2100°-2400° C.

Other features and advantages of the present invention will become apparent from the following description of the invention which refers to the accompanying drawings.

DETAILED DESCRIPTION OF EMBODIMENTS OF THE INVENTION

Figure 1:
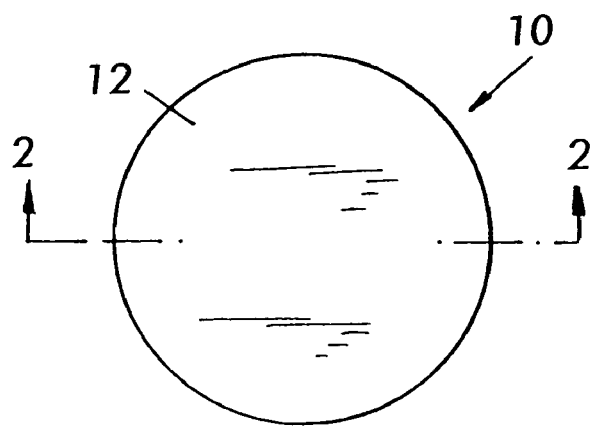
FIG. 1 shows a top plan view of a boron carbide body according to the present invention.
Figure 2:
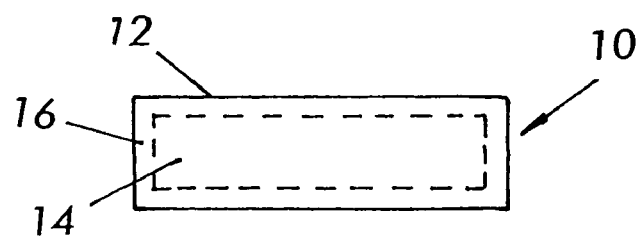
FIG. 2 shows a cross-sectional view of the boron carbide body of FIG. 1 along line 2-2 viewed in the direction of the arrows.

Referring to FIGS. 1 and 2, a $B_4C$ component according to an embodiment of the present invention is made from a boron carbide body 10 having a native graphite phase. Boron carbide body 10 includes an exterior surface 12 and a center region 14. According to one aspect of the present invention the concentration of graphite in a low graphite concentration region 16 adjacent the external surface is less than the concentration of graphite at the center region 14. Thus, center region 14 is surrounded by low graphite concentration region 16. Preferably, low graphite concentration region 16 is essentially free from graphite meaning that region 16 does not include enough graphite detectable by X-ray diffraction (XRD). It is believed that the current state of XRD equipment can detect graphite as little as about 0.05%-1% (by mole). Low graphite concentration region 16 may be any thickness. In the examples disclosed herein graphite was not detectable by XRD, which can penetrate about 25 microns into boron carbide body. Thus, low graphite concentration region 16 can be at least 25 microns thick.

Furthermore, in the preferred embodiment of the present invention, the boron carbide body 10 does not include any phases resulting from a non-native sintering agent in that a process for forming boron carbide body 10 according to the preferred embodiment does not necessitate the use of sintering agents. Therefore, the preferred embodiment, other than impurities, residues and phases, resulting from elements native to the starting material (e.g. graphite), only includes boron carbide.

A method for preparing a boron carbide body according to the present invention includes, forming a boron carbide green body, creating a boron-rich vapor environment around the boron carbide body to suppress preferential volitalization of boron from boron carbide, and sintering the boron carbide body. To create a boron-rich vapor either the boron vapor from the boron carbide body can be restricted or prevented from escaping by placing a boron nitride body in the proximity of or in contact with the boron carbide body, or by packing the boron carbide body in coarse-grained boron carbide which creates a boron-rich vapor from which the specimen benefits and yields a favorable result. It is preferred to have a boron nitride body in contact with the boron carbide green body. Preferably, the boron carbide body is pressureless sintered according to the method set forth in U.S. patent application Ser. No. 10/867,442 (set forth below), and after pressureless sintering the sintered body can be further sintered through a high isostatic pressing step (post-HIP step) as set forth in Ser. No. 10/867,442.

Specifically, U.S. patent application Ser. No. 10/867,442 (assigned to the assignee of the present application) discloses that limited densification in pressureless sintering without sintering agents may be due to the presence of $B_2O_3$ coatings on $B_4C$ particles. It is further disclosed that the vaporization of $B_2O_3$ coatings permits direct $B_4C$—$B_4C$ contact, and a corresponding surge in densification between 1870 and 2010° C.

Briefly, according to the disclosure of Ser. No. 10/867,442, to remove $B_2O_3$ coatings, $B_4C$ green body specimens are heated at a temperature between 1100° C.-1400° C. in a furnace and in the presence of a flowing He—$H_2$ gas mixture or in vacuum. If the gas mixture is used, prior to pressureless sintering, hydrogen is fully purged from the furnace chamber before continued heating. Otherwise, it is believed, hydrogen residing in interstitial locations within $B_4C$ particles facilitates increased evaporation/condensation coarsening of $B_4C$, and consequently lower final densities. To purge hydrogen, the specimens can be soaked in He or held in vacuum for a period of time prior to pressureless sintering. In order to create the boron-rich vapor, in one embodiment, the He flow rate may be reduced to prevent the boron vapor from escaping.

Thereafter, (after driving $B_2O_3$ out) the boron carbide body is heated in the presence of He at a heating rate in the range 50 to 150° C./minute to a soaking temperature selected from the range 2100 to 2400° C., and held at the soaking temperature until the shrinkage rate is about 0.005%/minute.

In addition, Ser. No. 10/867,442 teaches that pressureless-sintered specimens can be further densified with a post-HIP step. The components so densified reached RD values above 99% when pressed under 310 MPa of gas pressure.

Pressureless sintering should be kept below 2336° C. in order to avoid the decomposition of boron carbide, which can have adverse effects on the mechanical properties of the boron carbide article. Further, the pressureless soaking temperature should not exceed 2317° C. in order to prevent graphite formation which can also have negative effects on the mechanical properties of the boron carbide article. U.S. patent application Ser. No. 11/311,026, (assigned to the assignee of the present invention) which discloses an improvement of the method set forth in Ser. No. 10/867,442, discloses the underlying details for the beneficial results that may be attained when the soaking temperatures are selected in the ranges set forth above. The disclosure of Ser. No. 11/311,026 is incorporated by reference.

According to the preferred embodiment of the present invention no sintering agent is used to dope the boron carbide powder that is used to form the boron carbide green body. However, there is no specific restriction on the method of forming the boron carbide green body. That is, the boron carbide body can be formed using any known method including slip casting, CIPing, or the like.

The method for removing the boron oxide in the preferred embodiment of the present invention is essentially the same as that set forth in Ser. No. 10/867,442 and the improvement thereof as set forth in U.S. patent application Ser. No. 11/311, 026. Briefly, the method includes heating the green body to a temperature between 1100° C. and 1400° C. in the presence of a gas mixture of $H_2$ and He or in vacuum in order to drive the boron oxide out and obtain a reduced boron carbide body. Thereafter, if the gas mixture was used, the reduced boron carbide body is maintained at the same temperature in the presence of either flowing He or in vacuum in order to drive out any $H_2$ residing interstitially in the reduced boron carbide body. The time required for driving out the boron oxide and for driving out the residual $H_2$ can vary. Ser. No. 10/867,442 calls for 30-120 minutes for driving out the boron oxide and 120-480 minutes for driving out the residual hydrogen. These time values may change depending on the size of the boron carbide green body. It is noteworthy that vacuum is as effective as $H_2$ for removing $B_2O_3$. The $H_2$ reacts with $B_2O_3$ to form gases which are then removed. Vacuum removes the vapor that is produced by $B_2O_3$, which results in further vaporization of $B_2O_3$ until it has all been removed.

After the $H_2$ is driven out, the reduced and purged boron carbide body is heated to the soaking temperature and is held at that temperature in the presence of He until the shrinkage rate of the sintered boron carbide body reaches about 0.005%/minute. Thereafter, the boron carbide body is cooled.

A pressureless sintered boron carbide body according to the present invention can be further densified through post-HIPing to enhance its ballistic capabilities. To post-HIP a boron carbide body it is believed that a relative density of 93% or more is required.

Figure 3:
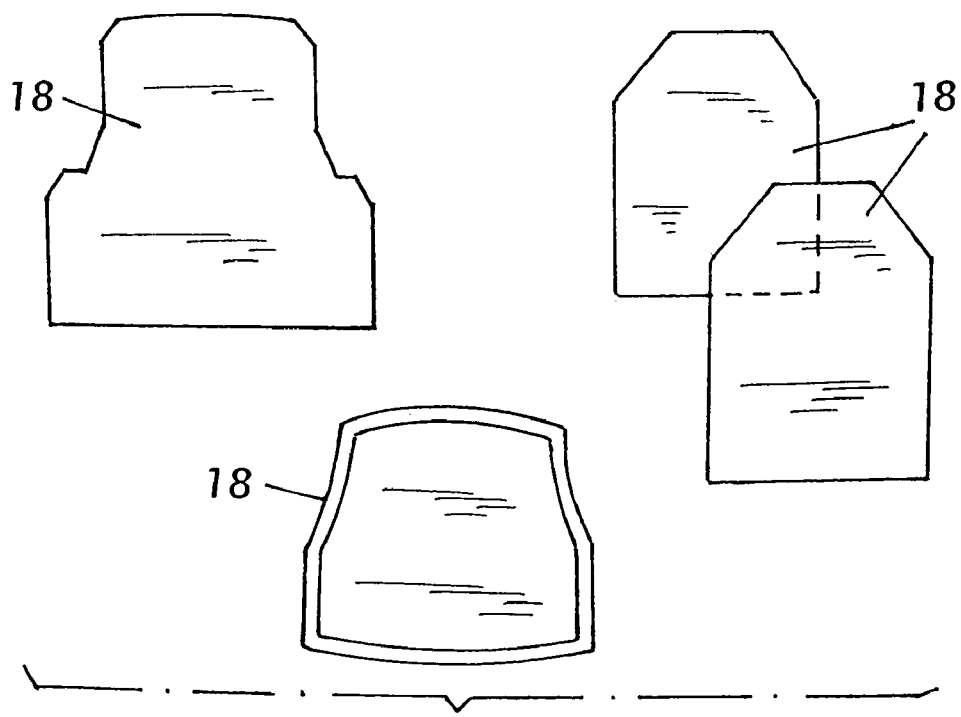
FIGS. 3-8 illustrate examples of components according to the present invention.

The example illustrated by FIGS. 1 and 2 shows a cylindrical body. The present invention is not restricted to a cylindrical body, however. Other complex bodies having other shapes are within the present invention. For example, a $B_4C$ body according to the present invention can be shaped to become part of an armor arrangement. Specifically, a $B_4C$ body according to the present invention may be shaped to become part of a personal armor or an armor part that follows the contours of a part of a human body (male or female) such as a human head, torso, back, groin, arm, leg, shoulder, or hip. Referring to FIG. 3, a $B_4C$ based component according to the present invention can be an insert 26 fabricated for thorax protection which generally follows the contours of the thorax of a human body. Thus, for example, an insert can be fabricated that generally follows the contours of the body of a female human, or a male human.

Figure 4:
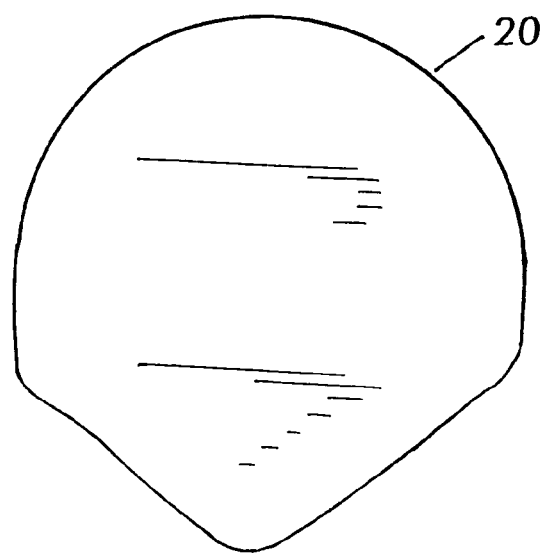

Referring to FIG. 4, a $B_4C$ component 20 according to the present invention can be fabricated to fit inside a helmet which generally follows the contours of the outer surface of a human skull. It is estimated that an insert 20 of 0.2" thick can be as light as 1.5 pounds.

Figure 5:
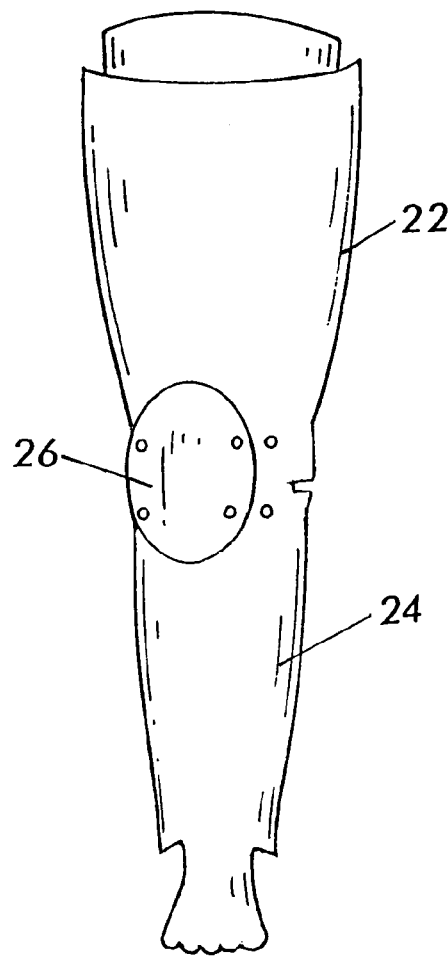

Referring to FIG. 5, a $B_4C$ component according to the present can be fabricated for limb protection which generally follows the contours of a portion of a limb of a human body. Thus, for example, a component can be fabricated that generally follows the contours of thigh 22, a shin 24, or a knee 26 portion of a human body.

Figure 6:
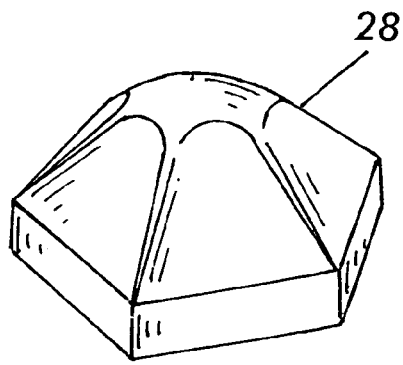

An insert according to the present invention, unlike armor inserts of the prior art, is a monolithic, one-piece body, rather than an armor part that is made from small tiles or the like flat plates that are supported on a backing material. It is, therefore, expected that a part fabricated according to the present invention will have superior ballistic properties. The present invention, however, can be used to form ballistic tiles to be used in prior art armor arrangements. An example of such a boron carbide tile 28 according to the present invention is shown in FIG. 6.

Figure 7:
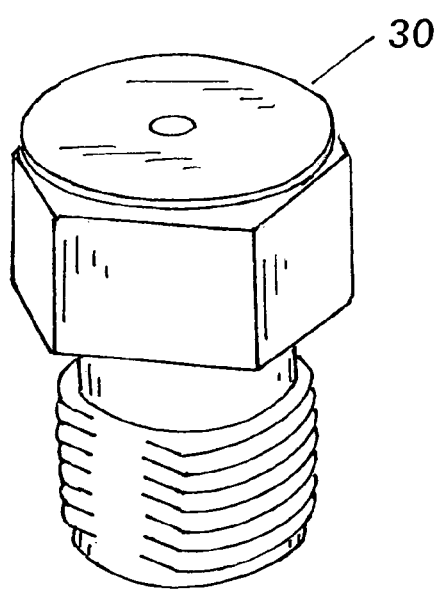

A boron carbide component according to the present invention is not limited to ballistic application. For example, referring to FIG. 7, a boron carbide nozzle 30 for slurry pumping and grit blasting having excellent abrasion resistance can be fabricated without significant post-fabrication shaping-related activities such as machining.

Figure 8:
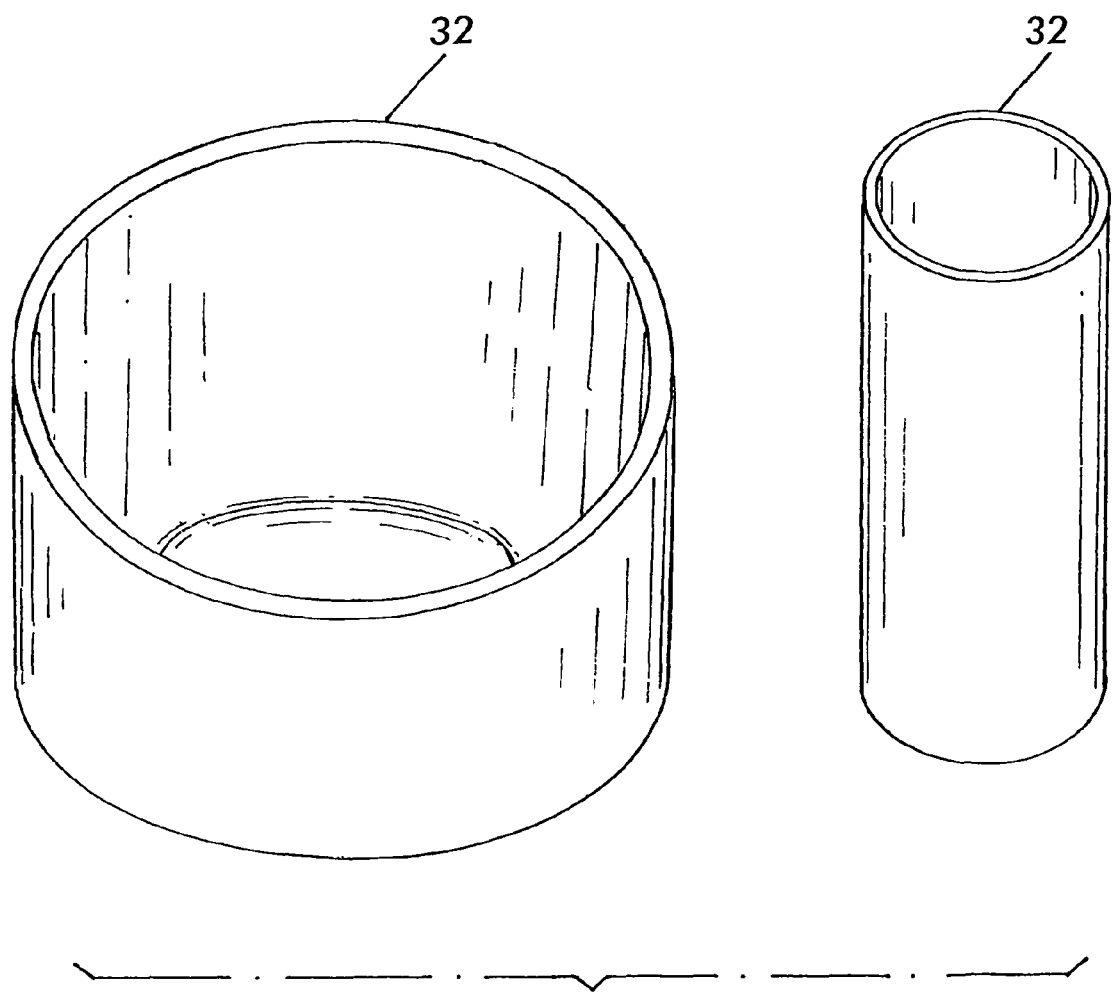

A process according to the present invention can be used to form other complex-shaped boron carbide components. For example, as seen in FIG. 8, a boron carbide component according to the present invention can be a boron carbide crucible 32.

A $B_4C$ component according to the present invention can also be used in vehicle and aircraft armor. In both cases, and specifically in the case of an aircraft, the weight of the armor is an important factor.

Example 1

Figure 9:
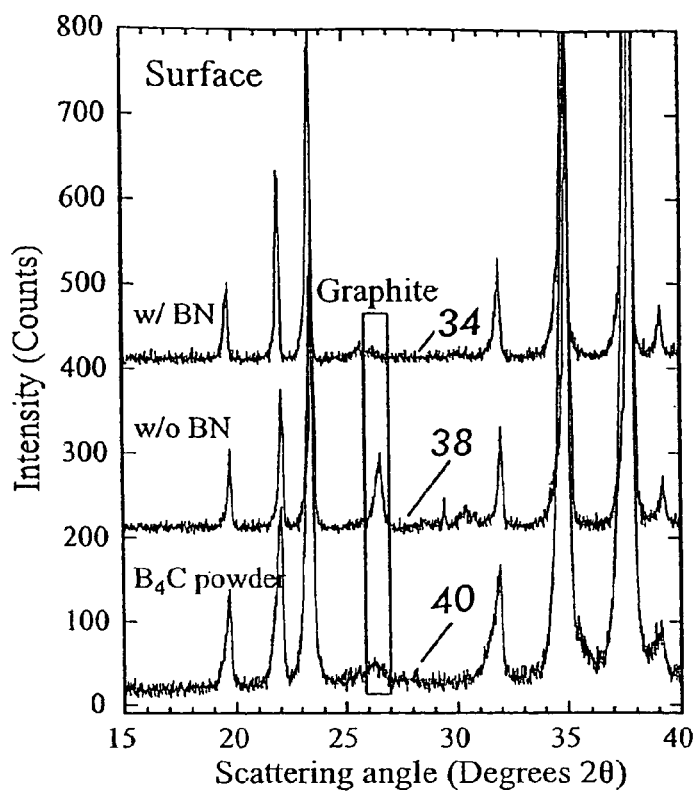
FIG. 9 shows XRD plots for the surface region of several boron carbide specimens.

The following illustrates and example of a boron carbide body and a method of manufacturing thereof according to the present invention. Boron carbide powder was pressed into cylinders of 6.44 mm in diameter and height of approximately 5 mm at 300 MPa to achieve a green density of about 66%. In one case, a specimen was placed on coarse-grained boron carbide powder, while in the other case a specimen was placed on a pressed disk of hexagonal boron nitride of dimensions 4.45 cm diameter by about 5 mm in height. The specimens were heated in a graphite heating element, graphite insulation furnace. The specimens were heated at the rate of 50° C. mm to 1300° C. in flowing 50:50 He/$H_2$ gas mixture soaking at that temperature for 30 min, followed by an additional two hour soak in flowing pure He. This was followed by heating at 100° C./min to 2250° C. in flowing helium and held for one hour. Specimens were then cooled at 50° C./min in flowing He. After reaching room temperature, these specimens were removed from the furnace and the top and bottom surfaces were ground using abrasive paper (120 grit SiC, Struers, Cleveland, Ohio) to remove near-surface debris (this abrasion was not believed to remove any sintered $B_4C$). The specimens were cut along the radial direction at the axial centers. The surface (before cutting) opposite that in contact with the setter (either $B_4C$ or hexagonal BN was then irradiated by X-ray diffraction (XRD, PW 1800 powder X-ray diffractometer, Phillips, Mahwah, N.J.), the results of which are shown in FIG. 9. The cut surfaces, representing the centers of the specimens, where also analyzed with XRD, the results of which are shown in FIG. 10.

Figure 10:
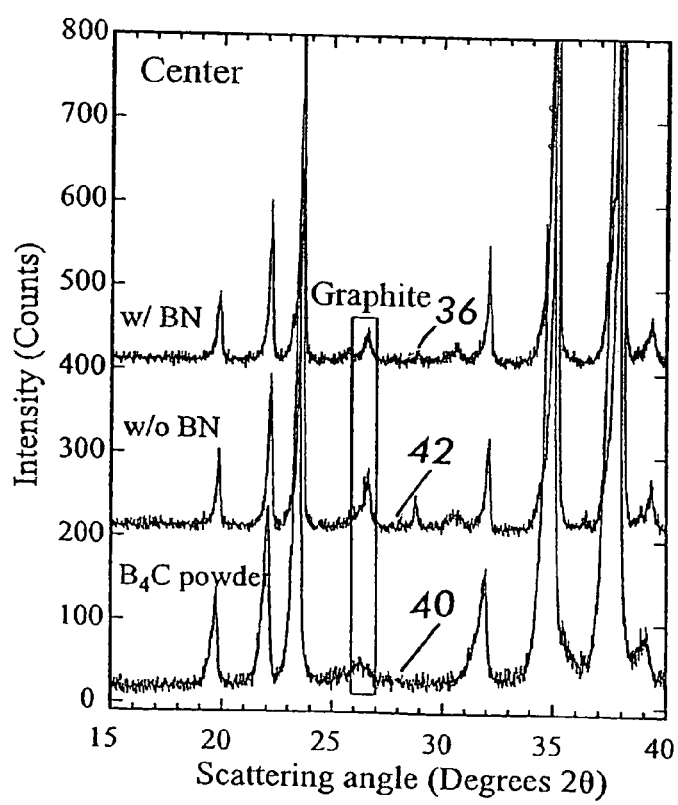
FIG. 10 shows XRD plots for the central region of several boron carbide specimens.

FIGS. 9 and 10 show comparisons of $B_4C$ powders before heat treatment, heat-treated with a BN setter, and heat-treated without a BN setter ($B_4C$ powder setter). FIG. 9 shows an XRD plot for the surface of a specimen in which BN setter was used (plot 32), in which a BN setter was not used (plot 38), and a plot for the boron carbide powder (plot 40). FIG. 10 shows an XRD plot for the central portion of a specimen in which BN setter was used (plot 34), in which a BN setter was not used (plot 42), and a plot for the boron carbide powder (plot 40).

Referring specifically to plot 34 of FIG. 9, when a BN setter was used, graphite was eliminated (to the level of detection by XRD) from the near-surface of the specimen (the penetration depth for x-ray diffraction is about 25 μm). Referring specifically to plot 36 of FIG. 10, based on the peak area, there was a clear reduction in free graphite content in the center of specimens in which a BN setter was used.

Without being bound by theory, it is believed that at temperatures approaching and at the soaking temperatures of 2250° C., the BN setter created a substantial vapor pressure of boron or boron-bearing gaseous species. These gases reacted with carbon in the $B_4C$ compact to form more boron carbide, as well as suppressing the tendency of boron carbide at these temperatures to form a vapor which is boron rich, leaving carbon behind. As the external vapor phase had better access to near-surface regions than regions closer to the specimen center, free graphite near the center was reduced but not eliminated. This would be increasingly true as the specimen sintered to approach the condition of closed porosity.

As is commonly-known by those knowledgeable in the field, the hardness of $B_4C$ decreases with increasing content of free carbon (graphite) second phase. A method according to the present invention eliminates graphite from near surface regions, which would significantly increase the hardness, and corresponding mechanical (including wear and ballistic) properties of the sintered body.

Note that, as disclosed above, a boron-rich vapor can be created by packing the boron carbide body in coarse boron carbide or by reducing the He flow rate. The positive effects of the latter two embodiments have been observed. Specifically, it has been observed that specimens prepared according to the prior art have a thin layer of graphite on the exterior thereof which can be easily rubbed off to expose the boron carbide below. However, when either of the foregoing two methods are used, the surfaces of the specimens are in fact boron carbide (no soft black surface residue).

It has also been found that the relative density of a boron carbide body prepared according to the pressureless sintering method as set forth herein and in U.S. patent application Ser. Nos. 10/867,442 and 11/311,026 can be further improved by the refinement of the boron carbide powder prior to forming the green body. Specifically, according to the improved method boron carbide particles of a selected diameter or smaller (e.g. 1 micron or less in diameter) are separated from a boron carbide powder mass that includes boron carbide particles of a plurality of different dimensions, a green body is formed using any known method from the powder containing the separated boron carbide particles, and then the green body is sintered. The green body formed from the separated particles is sintered according the process set forth above and disclosed in U.S. patent application Ser. Nos. 10/867,442 and 11/311,026. Further, in the preferred method, the boron carbide particles are separated by centrifuging, although other methods can be used to carry out the separating step. The following provides details of an example of a process according to the present invention.

Example 2

The following details an example of a method for manufacturing a boron carbide body using the improved method set forth above. The boron carbide powder used in a process according to the present invention indicated a powder having particles of various sizes, as indicted by the Certificate of Analysis provided by the supplier (H.C. Stark, HS-grade). Specifically, the certificate indicated the $d_{50}$ particle size to be 0.84 μm, with a $d_{90}$ of 2.73 μm and a $d_{10}$ of 0.2 μm. A centrifuge (GS-6, Beckman-Colter, Fullerton, Calif.) with 500 ml bottles was used as means to carry out the separating step. Forty grams of H.C. Starck HS powder, as received, was put in 400 ml of deionized water, shaken, and placed in the centrifuge. Using Stokes law, the target rpm to settle>1.0 μm boron carbide particles was 200g (where g is the acceleration of gravity) (1000 rpm) for 10 minutes. The supernatant after centrifuging was decanted and dried in an oven at 105° C. The dried powder was crushed by mortar and pestle and shaken through a 100 mesh screen.

The powders were then pressed into cylinders and sintered in a graphite furnace, set on a graphite stand, using conditions as enumerated in Example 1 (with the exceptions enumerated below). After sintering heat treatment, the relative densities of the specimens were measured using Achimedes principle (deionized water used as the immersion fluid), based on a $B_4C$ theoretical density of 2.52 g/cm$^3$. The results are given in Table 1. In Sample #2 the specimen was exposed to a mechanical-pump vacuum at 1300° C. for 30 min, which served the same purpose of extracting $B_2O_3$ coatings on $B_4C$ particles as did the $H_2$/He treatments. Two different soaking temperatures were evaluated, 2200° C. and 2250° C. In all cases, measured relative densities were surprisingly found to be in excess of 98%. In cases in which the uniaxial pressing pressure was lower, the propensity for formation of radial cracks was diminished. These cracks are observed, more often with larger parts, because of the non-uniform particle packing after uniaxial compression of the powder. Lower pressing pressures attenuated this problem without sacrificing the final sintered relative density. Cold isostatic pressing after uniaxial pressing is also well known to eliminate this problem.

The results obtained were significant since relative densities typically obtained without centrifuging the powders in the previous work was about 96.5%. Significantly, relative densities above 98% are the same as those obtained after hot pressing, without the shape restriction imposed by hot pressing. Specifically, it should be noted that a process in which particles are separated as set forth herein can be used to form complex shapes such as the one illustrated by FIGS. 3-9 and described herein. Hence boron carbide components can be fabricated in complex shapes with materials properties comparable to those $B_4C$ components fabricated from hot pressing.

TABLE 1

Green Body and Firing Conditions of Centrifuged Powders, and Resulting Relative Densities

| Sample Number | Uniaxial Pressure (MPa) | Oxide Removal | Soak Temperature (° C.) | Green Relative density | Fired Spec. Height (mm) | Fired Relative density | Radial Cracking |
|---|---|---|---|---|---|---|---|
| 1. | 300 | H₂ | 2200 | 61.0% | 4 . . . 93 | 98.1% | Yes |
| 2. | 600 | Vacuum | 2200 | 64.0% | 4 . . . 93 | 98.4% | Yes |
| 3. | 300 | H₂ | 2250 | 61.7% | 3 . . . 84 | 98.3% | Neglig. |
| 4. | 150 | H₂ | 2250 | 60.0% | 5 . . . 28 | 98.3% | Neglig. |

Note that a process according to all of the embodiments disclosed above can be further improved if the boron carbide powder is ultrasonically vibrated in the die prior to forming the green body. It has been observed that a green relative density of 55% is obtained, as opposed to a 50% relative density without it, when the boron carbide powder is vibrated.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A component comprising:
a unitary, single piece, monolithic, sintered boron carbide body consisting essentially of boron carbide and graphite and comprising entirely of ceramic, said unitary, single piece, monolithic, sintered boron carbide body having an exterior surface, a center region which includes boron carbide, and a region that includes boron carbide surrounding and adjacent said center region and extending continuously from said center region to said exterior surface, wherein the concentration of graphite in said region surrounding and adjacent said center region is less than the concentration of graphite of said center region, and wherein said region surrounding and adjacent said center region is essentially free of graphite.

2. The component of claim 1, wherein said boron carbide body is a part of an armor arrangement.

3. The component of claim 1, wherein said boron carbide body is a part of a personal armor arrangement.

4. The component of claim 3, wherein said personal armor arrangement is a helmet.

5. The component of claim 3, wherein said personal armor arrangement is shaped to the contours of a part of a human body.

6. The component of claim 3, wherein said part of said human body is head, or torso, or back, or groin, or arm, or leg, or shoulder, or hip.

7. The component of claim 3, wherein said contour corresponds to either a male body or a female body.

8. The component of claim 1, wherein said boron carbide body is a part of a vehicular armor arrangement.

9. The component of claim 1, wherein graphite content of said region surrounding said center region is less than 0.05% by mole.

10. The component of claim 9, wherein said region surrounding said center region is at least 25 microns thick.

11. The component of claim 1, wherein said region surrounding said center region is at least 25 microns thick.

* * * * *